United States Patent
Willard et al.

[11] Patent Number: 6,005,750
[45] Date of Patent: Dec. 21, 1999

[54] HEAD SUSPENSION INCLUDING COUPLED FLEXURE AND DAMPER CONSTRAINT LAYER

[75] Inventors: Daniel D. Willard, Hutchinson; Haiming Zhou, Eden Prairie, both of Minn.

[73] Assignee: Hutchinson Technology Incorporated, Hutchinson, Minn.

[21] Appl. No.: 08/968,443

[22] Filed: Nov. 12, 1997

[51] Int. Cl.$^6$ .......................... G11B 21/16; G11B 33/08
[52] U.S. Cl. ...................... 360/104; 360/97.02
[58] Field of Search ................ 360/104, 97.02

[56] References Cited

U.S. PATENT DOCUMENTS

| | | | |
|---|---|---|---|
| 3,349,384 | 10/1967 | Kohn | 360/104 |
| 3,665,434 | 5/1972 | Applequist et al. | 29/603.06 |
| 3,713,121 | 1/1973 | Fasano et al. | 360/103 |
| 4,204,235 | 5/1980 | Stollarz | 360/104 |
| 4,206,489 | 6/1980 | Manzke et al. | 360/105 |
| 4,208,684 | 6/1980 | Janssen et al. | 360/104 |
| 4,447,493 | 5/1984 | Driscoll et al. | 428/332 |
| 4,700,250 | 10/1987 | Kuriyama | 29/603.06 |
| 4,724,500 | 2/1988 | Dalziel | 360/104 |
| 4,760,478 | 7/1988 | Pal et al. | 360/104 |
| 4,777,551 | 10/1988 | Seki et al. | 360/104 |
| 4,807,070 | 2/1989 | Isozaki et al. | 360/104 |
| 4,819,094 | 4/1989 | Oberg | 360/104 |
| 4,905,111 | 2/1990 | Tuma et al. | 360/126 |
| 4,939,611 | 7/1990 | Connolly | 360/104 |
| 4,943,881 | 7/1990 | Isozaki et al. | 360/104 |
| 5,012,369 | 4/1991 | Owe et al. | 360/104 |
| 5,079,660 | 1/1992 | Yumura et al. | 360/104 |
| 5,118,562 | 6/1992 | Johnson et al. | 428/327 |
| 5,185,683 | 2/1993 | Oberg et al. | 360/104 |
| 5,187,625 | 2/1993 | Blaeser et al. | 360/104 |
| 5,299,081 | 3/1994 | Hatch et al. | 360/104 |
| 5,329,504 | 7/1994 | Mukawa | 369/75.2 |
| 5,333,085 | 7/1994 | Prentice et al. | 360/104 |
| 5,353,181 | 10/1994 | Frater et al. | 360/104 |
| 5,367,419 | 11/1994 | Kazama | 360/104 |
| 5,428,490 | 6/1995 | Hagen | 360/104 |
| 5,491,597 | 2/1996 | Bennin et al. | 360/104 |
| 5,526,205 | 6/1996 | Aoyagi | 360/104 |
| 5,530,606 | 6/1996 | Baasch et al. | 360/104 |
| 5,535,075 | 7/1996 | Takahashi et al. | 360/105 |
| 5,572,387 | 11/1996 | Brooks, Jr. et al. | 360/104 |
| 5,612,841 | 3/1997 | Johnson | 360/104 |
| 5,623,758 | 4/1997 | Brooks, Jr. et al. | 29/603.01 |
| 5,640,290 | 6/1997 | Khanna et al. | 360/97.01 |
| 5,682,279 | 10/1997 | Imasaki | 360/104 |
| 5,734,526 | 3/1998 | Symons | 360/104 |
| 5,771,135 | 6/1998 | Ruiz et al. | 360/104 |
| 5,771,136 | 6/1998 | Girard | 360/104 |
| 5,815,349 | 9/1998 | Frater | 360/104 |
| 5,838,517 | 11/1998 | Frater et al. | 360/104 |
| 5,870,258 | 2/1999 | Khan et al. | 360/104 |

FOREIGN PATENT DOCUMENTS

| | | | |
|---|---|---|---|
| 0 121 057 A1 | 10/1984 | European Pat. Off. . | |
| 0 617 411 A2 | 9/1994 | European Pat. Off. . | |
| 56-19554 | 2/1981 | Japan . | |
| 57-105860 | 7/1982 | Japan . | |
| 60-167172 | 8/1985 | Japan | 360/104 |
| 62-97168 | 5/1987 | Japan | 360/104 |
| 62-145583 | 6/1987 | Japan | 360/104 |
| 62-231462 | 10/1987 | Japan | 360/104 |

(List continued on next page.)

*Primary Examiner*—Craig A. Renner
*Attorney, Agent, or Firm*—Faegre & Benson LLP

[57] ABSTRACT

A head suspension includes a damper having a constraint layer formed unitarily with the flexure. The damper is located on the same face of the load beam as the flexure and acts to damp resonance vibrations of the head suspension. The constraint layer overlays the damper and is coupled to the flexure by a narrow neck. In this way, the constraint layer can be aligned and attached to the beam along with the flexure. This facilitates alignment of the constraint layer. Further, the narrowness of the neck coupling the constraint layer to the flexure reduces transmission of vibrations from the load beam to the flexure.

14 Claims, 5 Drawing Sheets

FOREIGN PATENT DOCUMENTS

| | | | |
|---|---|---|---|
| 1-62876 | 3/1989 | Japan | 360/104 |
| 1-70977 | 3/1989 | Japan | 360/104 |
| 2-44563 | 2/1990 | Japan | 360/104 |
| 8-203190 | 8/1996 | Japan . | |
| 9-134577 | 5/1997 | Japan . | |
| WO 92/05542 | 4/1992 | WIPO | 360/104 |
| WO 97/21212 | 6/1997 | WIPO . | |

HEAD SUSPENSION INCLUDING COUPLED FLEXURE AND DAMPER CONSTRAINT LAYER

TECHNICAL FIELD

The present invention relates generally to head suspensions for supporting read/write heads over recording media. In particular, the present invention includes a head suspension having damping structures.

BACKGROUND OF THE INVENTION

Head suspensions are well known and commonly used with dynamic storage devices or disk drives with rigid disks. The head suspension is a component within the disk drive which positions a read/write head over the desired position on the storage media where information is to be retrieved or transferred. The head suspension for a rigid disk drive typically includes a load beam supporting a flexure to which a head slider having a read/write head is mounted. The head slider "flys" on an air bearing generated by the spinning rigid disk. The flexure allows pitch and roll motion of the head slider and its read/write head as they move over the data tracks of the rigid disk. Head suspensions are usually connected to either a rotary or linear actuator arm for moving the head suspension and head slider over the spinning disk.

With the advent of more powerful computers and the rapid growth in the personal computer market it has become increasingly more important to enable the user to access data from storage devices with increased speed and accuracy. Also, the industry is producing increasingly smaller disks having increasingly higher information density.

Because of this need to reduce access times to enable rapid retrieval of data from higher density drives, it has become increasingly more important to reduce undesirable levels of vibration of components within the rigid disk drive. In relation to this, an important consideration in the design of head suspensions is resonance characteristics. Resonance vibrations of drive components can cause instability of the head suspension and other components in a rigid disk drive. Resonance vibrations may also delay the transfer of data because the data cannot be confidently transferred until the amplitude of the vibrations have substantially decayed.

Of particular importance are the first and second torsion resonance modes and lateral bending (or sway) resonance modes of vibration. These resonance modes can result in lateral movement of the head slider at the end of the head suspension and are dependent on cross-sectional properties along the length of the load beam. Torsion modes sometimes produce a mode shape in which the tip of the resonating head suspension moves in a circular fashion. However, since the head slider is maintained in a direction perpendicular to the plane of the disk surface by the stiffness of the load beam acting against the air bearing, lateral motion of the rotation is seen at the head slider. The sway mode is primarily lateral motion.

Resonance problems can be controlled either by designing the head suspension so that resonance frequencies are outside the range of frequencies normally encountered in the storage device or by limiting gain of resonance frequencies. One way to limit gain is by using damping techniques. The use of dampers on head suspensions to decrease the amplitude or gain of resonance vibrations is generally known and described in U.S. Pat. No. 5,187,625 issued to Blaeser et al. on Feb. 16, 1993 ("Blaeser") and U.S. Pat. No. 5,299,081 issued to Hatch et al. on Mar. 29, 1994.

Use of dampers in head suspension design and construction typically involves use of a damping material, such as visco-elastic material, overlaying a portion of the load beam. Visco-elastic materials can expand and compress at a free surface thereof. However, greater energy can be dissipated by the damping material, achieving greater damping, if the free surface of the damping material is not allowed to expand and compress and the damping material is forced to shear. Accordingly, greater damping can be achieved by constraining the free surface of the damper with a relatively rigid constraint layer.

Constraint layers are often formed from stainless steel or other rigid material. For example, Blaeser discloses a head suspension having a load beam formed of a top constraint layer of stainless steel, a middle layer of damping material and a lower constraint layer of stainless steel. The entirety of the load beam, including the rigid region, spring or radius region and base or mounting region, has this laminated construction. In one embodiment of Blaeser, the flexure and the lower constraint layer are formed from a single sheet of stainless steel. This has the advantage of mitigating some of the difficulties of alignment of the flexure and/or the lower constraint layer when they are integrated with the remainder of the head suspension in assembly because they can both be aligned and attached at the same time.

However, making the flexure and the lower constraint layer together as one piece of the load beam can cause excessive transfer of resonance vibrations from the constraint layer to the flexure through the coupling region. Further, the radius region of the load beam primarily controls the spring characteristics of the load beam such as gram load (the force in the direction of the disk which the load beam places on the head slider) and spring rate (roughly, the stiffness of the radius region). As such, extending the laminated structure completely through the spring region and onto the base can adversely impact the spring characteristics of the radius region. Moreover, attaching the flexure to the load beam only via the flexure's connection to the lower constraint layer of the damper, rather than also attaching the flexure directly to the load beam, can also increase vibration in the flexure because there are fewer attachment points to stabilize the flexure.

Accordingly, there is a continuing need for improved damping of head suspensions. In particular, transfer of vibration of the load beam to the flexure should be reduced. Also, the spring characteristics of the load beam should be effected as little as possible by the damping. Additionally, the damped suspension should be reliable and capable of being efficiently manufactured.

SUMMARY OF THE INVENTION

The present invention includes a reliable, efficient to manufacture head suspension having a damper including a constraint layer. The head suspension includes a load beam having a proximal end, a distal end, a mounting region on the proximal end, a rigid region between the mounting region and the distal end, and a spring region between the mounting region and the rigid region. A flexure for supporting a head slider is located at the distal end of the load beam. The flexure includes a bond pad for supporting a head slider and a mounting portion which is directly attached to the rigid region of the load beam. The head suspension also includes a damper for damping vibrations of the head suspension. The damper includes damping material and a constraint layer coupled to the flexure and overlying the damping material. The constraint layer is preferably coupled to the flexure by a narrow neck which is narrower than both the mounting portion of the flexure and the constraint layer. The narrowness of the neck reduces transfer of resonance vibrations from the load beam to the flexure but still provides for accurate alignment.

DETAILED DESCRIPTION OF THE PREFERRED EMBODIMENTS

Figure 1:
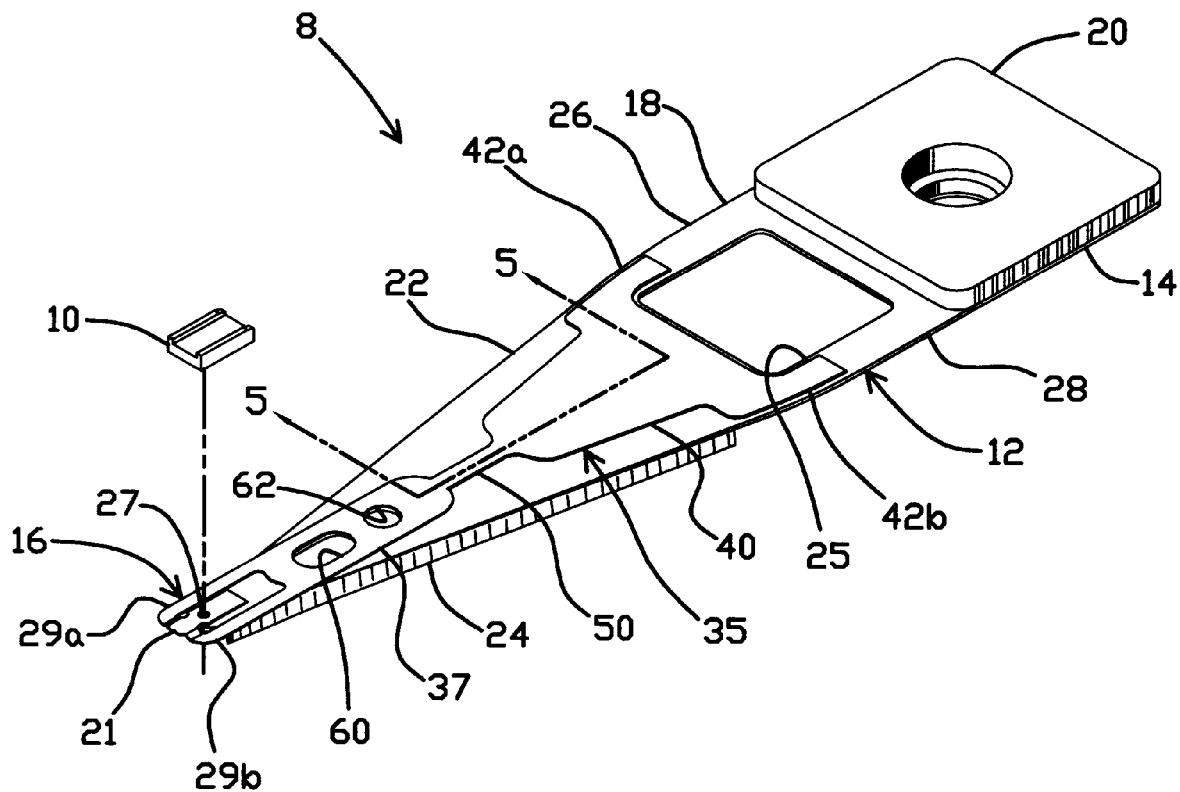
FIG. 1 is an isometric view of the bottom of a head suspension including a flexure formed integrally with a constraint layer for a damper in accordance with the present invention.
Figure 2:
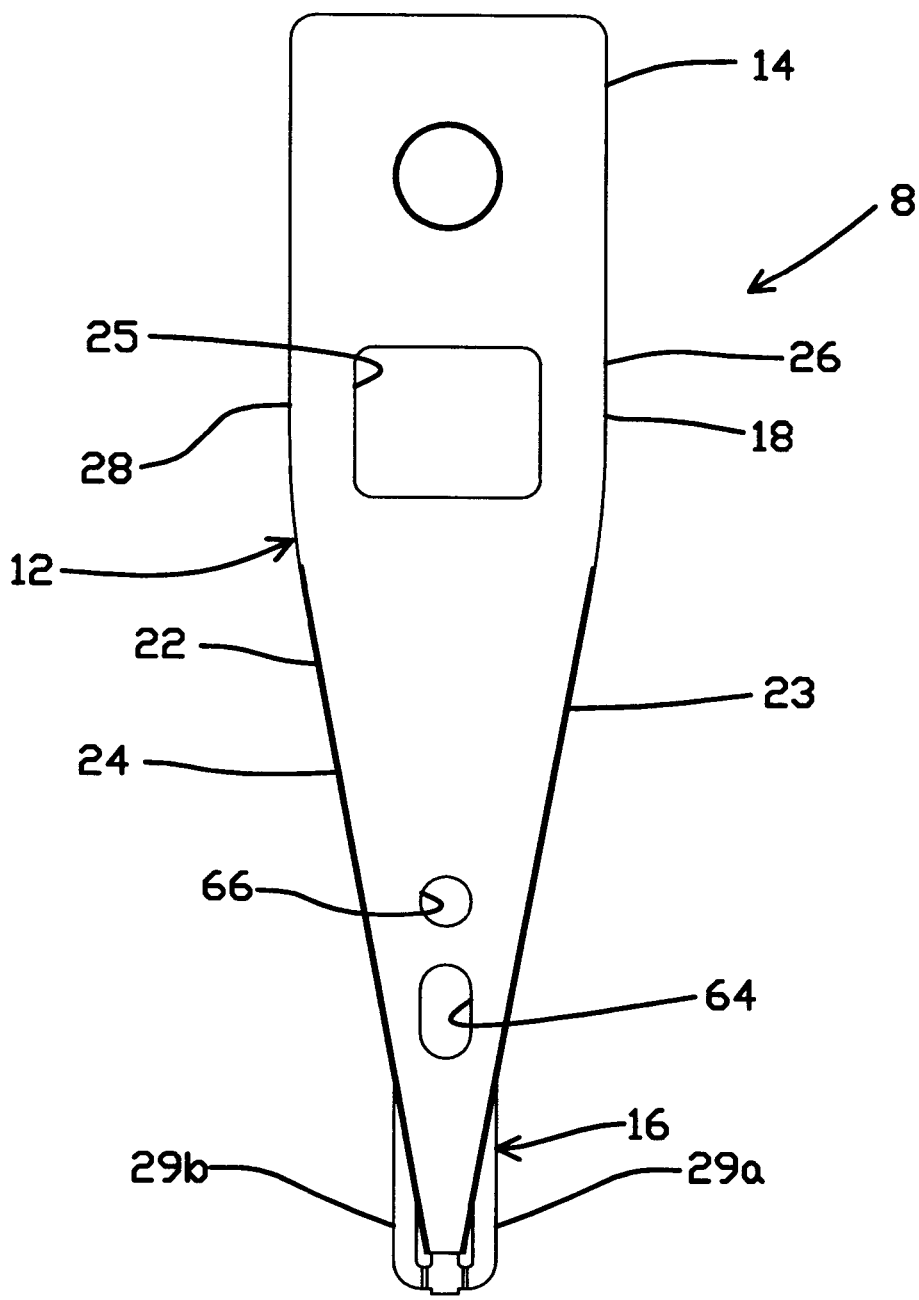
FIG. 2 is a top plan view of the head suspension of FIG. 1.

A first embodiment of a head suspension 8 in accordance with the present invention is shown in a bottom, isometric view in FIG. 1 and in a top view in FIG. 2. Head suspension 8 includes a load beam 12 having a base or mounting region 14 on a proximal end, a relatively rigid region 22 adjacent to the flexure, and a radius or spring region 18 between the mounting region 14 and rigid region 22. A base plate 20 is mounted to mounting region 14 such as by spot welds to facilitate mounting of suspension 8 to a disk drive actuator arm (not shown). First and second edge rails 23 and 24 are formed in transversely opposite sides of the rigid region 22 as known to enhance stiffness in the rigid region. Spring region 18 has an aperture 25 located in the center thereof as known for determining the spring rate of the spring region 18. On one side of aperture 25 is a first radius arm 26 and on the other side is a second radius arm 28. Load beam 12 also has alignment apertures 64 and 66. Load beam 12 can be fabricated and formed from a sheet of stainless steel or other resilient material in a conventional manner.

The spring region 18 of the load beam 12 includes a preformed bend or radius. This radius provides the spring or load force and thus a desired load to a head slider 10 for a predetermined offset height, the offset height being a measurement of the distance between the mounting surface of the head suspension and the air bearing surface of the head slider 10 at "fly" height.

A spring connection is provided between the head slider 10 and the distal end of the load beam 12 by a flexure 16 located at the distal end of the load beam and which permits the head slider to move in pitch and roll directions so that it can compensate for fluctuations of a spinning disk surface above which the slider 10 "flies." Flexure 16 includes tongue 21 supported between spring arms 29a and 29b which extend from a mounting portion 37 which is formed by a portion of the surface of flexure 16. Tongue 21 includes a bond pad 27 to which head slider 10 is mounted. Flexure 16 also includes alignment apertures 60 and 62 in the mounting region for alignment with apertures 64 and 66, respectively, when mounting flexure 16 to load beam 12. Many different types of flexures, also known as gimbals, are known to provide the spring connection allowing for pitch and roll movement of the head slider and are contemplated to be used with the present invention.

Figure 4:
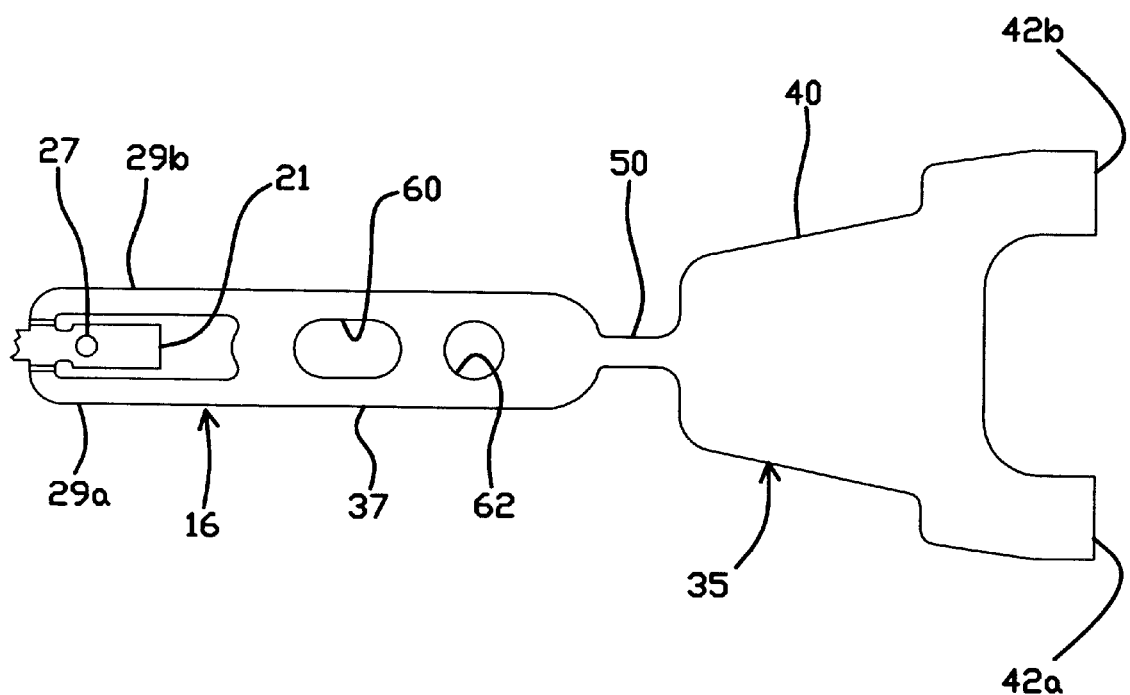
FIG. 4 is a top view of the flexure and constraint layer shown in FIG. 1.
Figure 5:
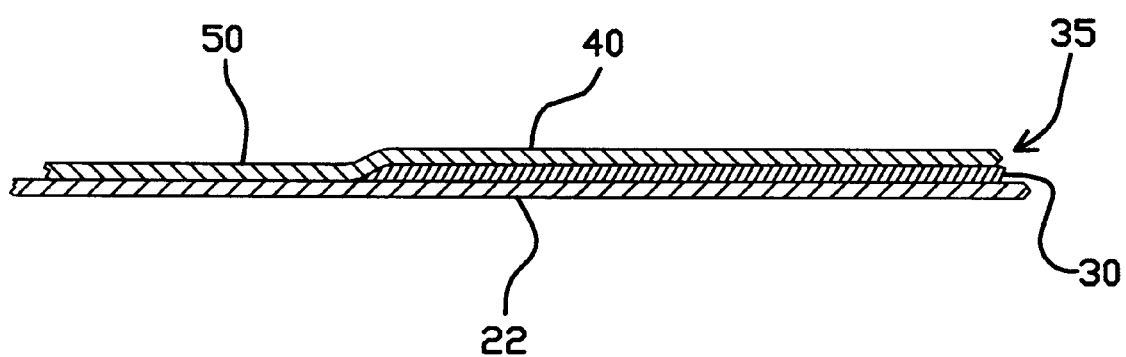
FIG. 5 is a sectional view of the head suspension shown in FIG. 1 taken along line 5—5 of FIG. 1.

As shown in FIG. 5, which is a sectional view of load beam 12 taken along line 5—5 of FIG. 1, head suspension 8 also includes a damper 35 which includes damping material 30 and constraint layer 40. Damping material 30 is located on the same face of load beam 12 as the mounting portion 37 of flexure 16 and constrained on a first surface by the rigid region 22 and a portion of radius arms 26 and 28. Damping material 30 is further constrained on its other major surface by constraint layer 40. As shown in FIG. 4, which is a bottom view of constraint layer 40 coupled to flexure 16, constraint layer 40 is generally trapezoidal with a first prong 42a and second prong 42b extending proximally from therefrom. First prong 42a extends partially onto first radius arm 26 and second prong 42b extends partially onto second radius arm 28 to control vibrations thereof. However, neither prong 42a nor prong 42b extend far enough onto the radius arms 26 and 28, respectively, to significantly effect the spring characteristics such as gram load and spring rate of load beam 12. Constraint layer 40 and damping material 30 are preferably co-extensive. Accordingly, damping material 30 preferably has the same shape as constraint layer 40. Preferably, neither damping material 30 nor constraint layer 40 extends past the lateral edges of the rigid region 22.

It is also within the ambit of the present invention to interleave the distal end of flexure 16 with the distal end of load beam 12. That is, locate mounting portion 37 of flexure 16 on the same side of load beam 12 as edge rails 23 and 24. Spring arms 29a and 29b extend over the distal tip of load beam 12 and tongue 21 is then supported between arms 29a and 29b beneath the distal tip of load beam 12, that is, on the face of load beam 12 opposite to edge rails 23 and 24. Such a interleaved flexure/load beam assembly is disclosed in U.S. Pat. No. 5,790,347 issued Aug. 4, 1998 and owned by Hutchinson Technology Incorporated of Hutchinson, Minn., the owner of the present application, and is hereby incorporated by reference in its entirety. By interleaving flexure 16 and load beam 12 in this way, damper 35 including constraint layer 40 and damper material 30, which extend from flexure mounting portion 37, can be located on the same face of load beam 12 as edge rails 23 and 24. The rails 23 and 24 may also be on the opposite side of load beam 12 from that shown in FIG. 1 such that the entire flexure 16 is located on the face of the load beam 12 which is on the same side, and partially between, rails 23 and 24.

Damper 35 reduces vibrations by changing strain energy (deflection) into heat It follows that the greater the strain at the location of damper 35 on the head suspension 8, the more heat generated and the greater the damping capability. Thus, it is advantageous to locate damper 35 in a region of high strain on head suspension 8 during resonance vibrations. Areas of high strain will vary depending on the head suspension design and can be determined for a particular design either empirically or by using known methods of finite element analysis for computer modeling of load beam characteristics. As such, the exact configuration of damper 35 is dependent upon the design of the head suspension with which it is used and the damping dynamics desired.

Accordingly, it is contemplated that constraint layer 40 may extend beyond edges of damping material 30. It is also contemplated that damping material 30 and constraint layer 40 have a different shape than that shown in FIGS. 1 and 3. It should be further noted that neither damping material 30 nor constraint layer 40 need extend at all onto radius arms 26 or 28. For example, all or a portion of damping material 30 can be sandwiched between constraint layer 40 and a portion of only the rigid region 22 of load beam 12. Constraint layer 40 can be formed of stainless steel or other rigid material. Damping material 30 is preferably formed of visco-elastic material but can be formed of other types of damping material. Details of damping material useable with the present invention are provided below.

Between mounting portion 37 of flexure 16 and constraint layer 40 is neck 50 which is substantially narrower, in a lateral direction, than both constraint layer 40 and mounting portion 37. Neck 50 couples a distal end of constraint layer 40 with a proximal end of flexure 16. In the embodiment shown in FIG. 5, damping material 30 extends only between constraint layer 40 and load beam 12. As such, neck 50 is in direct contact with the rigid region 22 of load beam 12. It is also contemplated, however, that damping material 30 also extend between the neck 50 and the rigid region 22 of load beam 12 or that neck 50 extend above load beam 12, remaining out of contact therewith, without any damper material between neck 50 and load beam 12.

By coupling flexure 16 to constraint layer 40 via neck 50, constraint layer 40 can be aligned and attached to load beam 12 along with flexure 16 in one step. This cuts down on assembly steps required for fabrication of head suspension 8. Further, flexure 16 includes alignment apertures 60 and 62 which are used to accurately align flexure 16 with alignment apertures 64 and 66, respectively, of load beam 12 when attaching flexure 16 to load beam 12. Thus, coupling flexure 16 to constraint layer 40 improves alignment of constraint layer 40 when attaching it to load beam 12.

Neck 50 is formed to be rigid enough to allow the constraint layer 40 to be accurately positioned and mounted to load beam 12 simultaneously with flexure 16, as discussed above. However, neck 50 is also formed laterally relatively narrow such that the transfer of resonance vibrations from load beam 8 to flexure 16 is relatively small. It is also within the ambit of the present invention to reduce the thickness of neck 50, such as by partial etching, so as to make neck 50 thinner such that transfer of vibration is even further reduced. It is also contemplated to cut neck 50 after flexure 16 and constraint layer 40 are attached to load beam 12 to reduce even further any transfer of resonance vibration of load beam 12 to flexure 16.

Vibration of flexure 16 can also be reduced by attaching flexure 16 directly to load beam 12 at an mounting portion 37 on flexure 16 itself rather than only by attaching constraint layer 40 to load beam 12 and thereby having flexure 16 remain attached to load beam 12 only via neck 50. Preferably, the mounting portion 37 where flexure 16 is attached to load beam 12 includes attachments points 72 and 74 shown in the embodiment of FIG. 3, although other attachment points may be considered in other embodiments. Flexure 16 can be attached at attachment points 72 and 74 by adhesive, welding or other known means.

Figure 3:
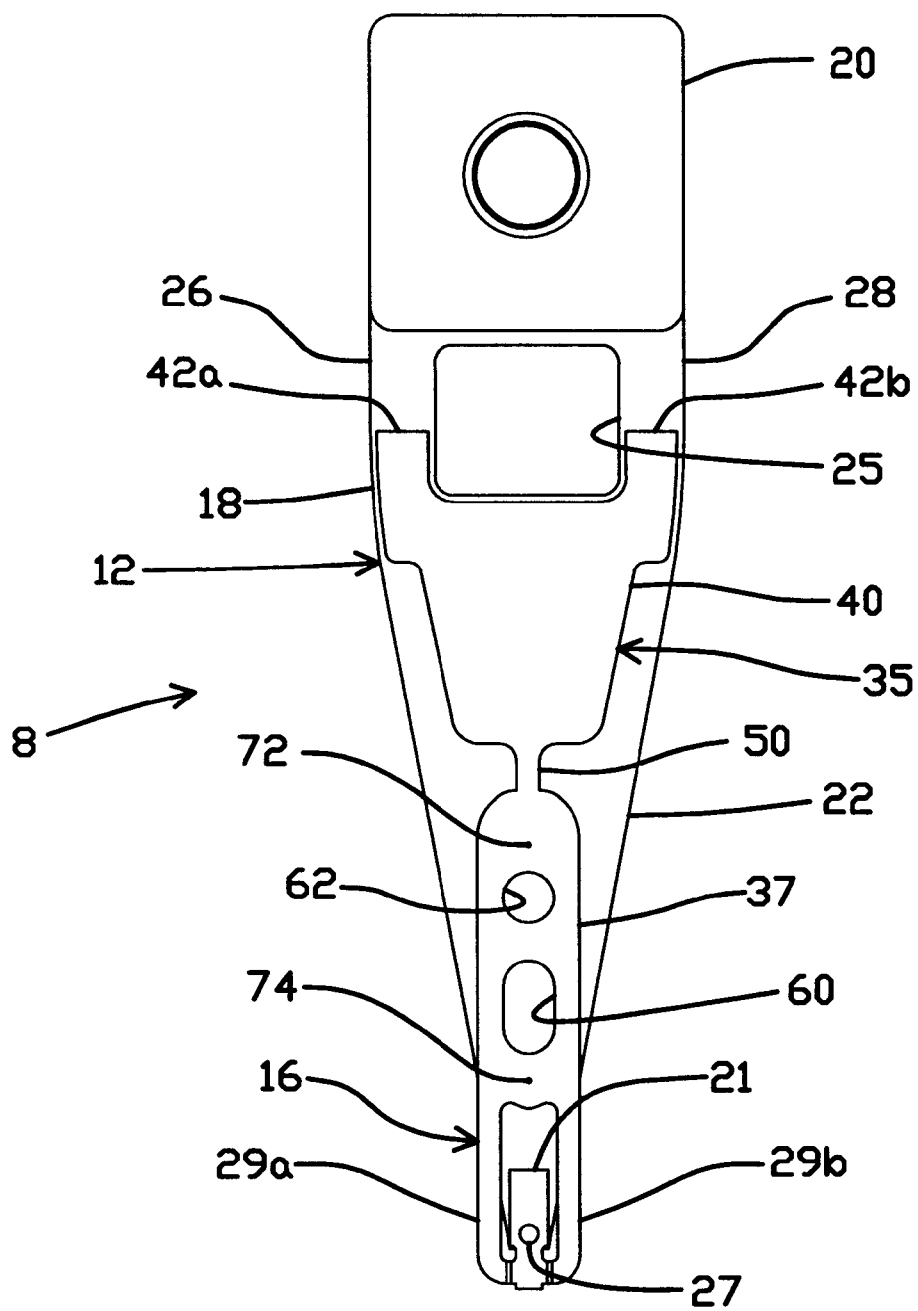
FIG. 3 is a bottom view of the head suspension of FIG. 1.

When resonance vibrations of head suspension 8 occur, damping material 30 undergoes shearing action acting to dissipate energy from the resonance vibrations. In this way, damping material 30, constrained by load beam 12 and constraint layer 40, acts to effectively damp resonance vibrations of load beam 12. For example, first torsion resonance mode gain, second torsion resonance mode gain, and sway resonance mode gain were observed for two head suspensions each having a T850 load beam, the design of which is shown in FIGS. 1 and 2 and which are available from Hutchinson Technology Incorporated of Hutchinson, Minn. One T850 load beam was damped in accordance with the present invention using damping material 30, constraint layer 40, and narrow neck 50, mounted to the T850 load beam as shown in FIGS. 1, 3, and 5, and the second T850 load beam was not damped in accordance with the present invention. Below is a chart of frequency and gain for first torsion, second torsion, and sway resonance modes for the two head suspensions.

|  | 1st Torison Freq. (Hz) | 1st Torison Gain (db) | 2nd Torison Freq. (Hz) | 2nd Torison Gain (db) | Sway Freq. (Hz) | Sway Gain (db) |
| --- | --- | --- | --- | --- | --- | --- |
| Undamped | 2322 | 4.45 | 6331 | 36.7 | 10425 | 39.8 |
| Damped | 3100 | 1.42 | 7671 | 17.6 | 10945 | 37.7 |

As shown, the first torsion gain for the undamped suspension is 4.45 db (decibels) and for the suspension damped in accordance with the present invention, the gain is 1.42 db. For the second torsion mode, the gain of the undamped suspension is 36.7 db and the gain for the suspension damped in accordance with the present invention is 17.6 db. Finally, for the sway mode, the gain of the undamped suspension is 39.8 db and the gain for the suspension damped in accordance with the present invention is 37.7 db. Thus, damping a suspension in accordance with the present invention acts to significantly reduce the amplitude of the resonance modes, particularly with respect to the first and second torsion modes. Other damper designs in accordance with the present invention could yield different damping results such as more effectively damping other resonance modes.

To fabricate head suspension 8 having damper 35 including damping material 30 and constraint layer 40, load beam 12 can be formed from a single sheet of stainless steel or other similar material using methods known in the art For example, blanks can be chemically etched to the appropriate dimensions, the blanks can then be formed to provide a spring or spring region 18, rigid region 22, and mounting region 14. Constraint layer 40, neck 50, and flexure 16 can also be formed from a single sheet of stainless steel, preferably having a thickness of between about 13 micrometers and about 51 micrometers, or other similar material by chemically etching blanks using methods known in the art. Damping material 30 can be stamped from a sheet of dry film visco-elastic material preferably having a thickness of about between 13 micrometers and 127 micrometers. Preferred visco-elastic material includes "SCOTCH" brand visco-elastic damping material ISD 110 commercially available from Minnesota Mining and Manufacturing Company of St Paul, Minn. Damping material 30 preferably is placed on constraint layer 40 and can be adhered thereto using a brief pre-cure. Alignment apertures 60 and 62 are then used to align flexure 16 with load beam 12 and flexure 16 is attached to load beam 12 by welding, adhesive, or any known method. Simultaneously, constraint layer 40 and damping material 30 are attached to load beam 12. When using "SCOTCH" brand visco-elastic damping material ISD 110, damping material 30 can then be fully cured (for 5 to 8 minutes at 93° C.) to adhere damping material 30 to load beam 12 and fully adhere damping material 30 to constraint layer 40.

Though the present invention has been described with reference to preferred embodiments, those skilled in the art will recognize that changes can be made in form and detail without departing from the spirit and scope of the invention.

What is claimed is:

1. A head suspension for use in a rigid disk drive and to support a head slider, comprising:

a load beam having a proximal end, a distal end, a mounting region on the proximal end, a rigid region between the mounting region and the distal end, and a spring region between the mounting region and the rigid region;

a flexure at the distal end of the load beam including a mounting surface portion that is in direct physical contact with and is connected to the rigid region on one side of the load beam, and a bond pad for supporting a head slider; and a damper comprising:

damping material located on the load beam and for damping vibrations thereof, and a constraint layer located on the same side of the load beam as the mounting surface portion of the flexure, the constraint layer overlying the damping material, wherein the constraint layer and the flexure are joined to one another such that the constraint layer and the flexure are together alignable on the one side of the load beam.

2. The head suspension of claim 1 wherein the damping material and the constraint layer overlay only a portion of the rigid region of the load beam.

3. The head suspension of claim 1 wherein the damping material and the constraint layer are co-extensive.

4. The head suspension of claim 1 further including a neck that is narrower than the flexure mounting surface portion and the constraint layer, the neck coupling the flexure to the constraint layer to allow the constraint layer to be aligned and attached to the load beam along with the flexure and such that the narrowness of the neck reduces transfer of resonance vibrations from the load beam to the flexure.

5. The head suspension of claim 4 wherein the flexure, narrow neck and constraint layer are formed unitarily from a same sheet of material.

6. The head suspension of claim 1 wherein the damping material is visco-elastic material.

7. The head suspension of claim 1 wherein the damping material and constraint layer overlay a portion of the spring region of the load beam.

8. A head suspension for use in a rigid disk drive and for support of a head slider, comprising:

a load beam having a proximal end, a distal end, a mounting region on the proximal end, a rigid region between the mounting region and the distal end, and a spring region between the mounting region and the rigid region;

a flexure at the distal end of the load beam and including a mounting portion and a bond pad for supporting a head slider, the mounting portion physically connected directly to the rigid region on one side of the load beam; and a damper comprising:

damping material located on the load beam and for damping vibrations thereof;

a constraint layer overlaying the damping material and attached to the load beam by the damping material; and a neck joining the mounting portion of the flexure to the constraint layer, the neck being narrower than either the flexure mounting portion or the constraint layer, and the neck further to allow the constraint layer to be aligned and attached to the load beam together with the flexure and such that narrowness of the neck reduces transfer of resonance vibrations from the load beam to the flexure.

9. The head suspension of claim 8 wherein the flexure, narrow neck, and constraint layer are formed unitarily from a same sheet of material.

10. The head suspension of claim 8 wherein the damping material and constraint layer overlay a portion of the spring region of the load beam.

11. The head suspension of claim 8 wherein the damping material and the constraint layer overlay the rigid region of the load beam and overlay only partially the spring region of the load beam such that the effects of the damping material and the constraint layer on the spring characteristics of the load beam are reduced.

12. The head suspension of claim 8 wherein the damping material and the constraint layer are co-extensive.

13. The head suspension of claim 8 wherein the damping material is visco-elastic material.

14. The head suspension of claim 8 wherein the damping material and the constraint layer overlay only a portion of the rigid region of the load beam.

* * * * *